United States Patent
Nayak et al.

(10) Patent No.: US 12,348,615 B2
(45) Date of Patent: Jul. 1, 2025

(54) DATA STORAGE DEVICE BACKUP

(71) Applicant: Western Digital Technologies, Inc., San Jose, CA (US)

(72) Inventors: Dattatreya Nayak, Bangalore (IN); Arun Shukla, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 105 days.

(21) Appl. No.: 18/365,017

(22) Filed: Aug. 3, 2023

(65) Prior Publication Data
US 2024/0195608 A1    Jun. 13, 2024

Related U.S. Application Data

(60) Provisional application No. 63/431,253, filed on Dec. 8, 2022.

(51) Int. Cl.
*H04L 9/08*      (2006.01)
(52) U.S. Cl.
CPC ................................ *H04L 9/0827* (2013.01)
(58) Field of Classification Search
CPC ......... H04L 9/08; H04L 9/0827; H04L 63/10; G06F 21/00; G06F 21/60; G06F 21/62; G06F 21/78
See application file for complete search history.

(56) References Cited

U.S. PATENT DOCUMENTS

| | | | |
|---|---|---|---|
| 7,899,189 B2 | 3/2011 | Dawson et al. | |
| 9,208,335 B2* | 12/2015 | Wu | H04L 9/3234 |
| 9,906,366 B1* | 2/2018 | Maria | H04L 63/0861 |
| 10,303,899 B2* | 5/2019 | Durham | G06F 8/63 |
| 11,995,223 B2* | 5/2024 | Klapman | H04L 9/30 |
| 12,058,259 B2* | 8/2024 | Klapman | G06F 3/064 |
| 2016/0352733 A1* | 12/2016 | Oxford | H04L 9/0866 |
| 2023/0073608 A1* | 3/2023 | Awasthy | G06Q 40/03 |

FOREIGN PATENT DOCUMENTS

WO     2022086602 A1    4/2022

* cited by examiner

*Primary Examiner* — Hosuk Song
(74) *Attorney, Agent, or Firm* — Patent Law Works LLP

(57) ABSTRACT

This disclosure relates to systems, methods, and data storage devices, such as a data storage device comprising a data path and a controller. The data path comprises a data port to transmit data between a host computer system and the data storage device. The data storage device registers with the host computer system as a block data storage device. A non-volatile storage medium stores encrypted user content data. A cryptography engine is connected between the data port and the storage medium and uses cryptographic key data to encrypt and decrypt user content data. The controller is configured to send the encrypted user content data for back-up storage external to the data storage device as encrypted by the cryptographic key data, and communicate with a user device over a communication channel that is different from the data path, to send the cryptographic key data for decryption of the encrypted user content external to the data storage device.

20 Claims, 3 Drawing Sheets

DATA STORAGE DEVICE BACKUP

TECHNICAL FIELD

Aspects of the disclosure relate generally to data storage device hardware and, more specifically, to systems and methods for backing up data stored on a data storage device.

BACKGROUND

Many data storage devices (DSDs) are available and are typically connected to the host computer system via a data link, such as Fiber Channel (FC), Serial Advanced Technology Attachment (SATA), Serial Attached Small Computer System Interface (SAS), or others. DSDs may be located within the host computer system or outside the host computer system, such as on a separate rack in a server room.

The host computer system further comprises a processor and a volatile memory, such as random-access memory (RAM). The host computer system may be a desktop or laptop computer, a mobile device, or a server in a data centre and may have an operating system, such as Microsoft Windows or Linux installed thereon. The host computer system may also be a virtual machine or a cloud instance or any other computing device. The DSD comprises a controller, a physical data storage medium, and a read/write device. While some examples relate to a hard disk drive (HDD) with a rotating medium, this disclosure equally applies to other storage media, such as those found in solid state drives (SSDs) or tapes.

The DSD may provide encrypted data at rest by implementing full disk hardware encryption. To this end, the controller includes hardware circuitry that performs encryption functions, such as Advanced Encryption Standard (AES). The controller can then encrypt all data that it receives via the data link and store the encrypted data on the storage medium. Vice versa, the controller retrieves encrypted data from the storage medium, decrypts the data, and sends the decrypted data over the data link.

One difficulty with data storage is that the DSD may be physically removed or stolen with the data stored thereon, leading to loss of data for the user. Therefore, it would be desirable to provide a back-up solution.

SUMMARY

One general aspect includes a data storage device that includes a data path and a controller. The data path includes: a data port configured to transmit data between a host computer system and the data storage device, where the data storage device is configured to register with the host computer system as a block data storage device; a non-volatile storage medium configured to store encrypted user content data, and a cryptography engine connected between the data port and the storage medium and configured to use cryptographic key data to encrypt user content data received from the host computer system and to decrypt the encrypted user content data stored on the storage medium in response to a request from the host computer system. The controller is configured to: send the encrypted user content data for back-up storage external to the data storage device as encrypted by the cryptographic key data; and communicate with a user device over a communication channel that is different from the data path, to send the cryptographic key data for decryption of the encrypted user content external to the data storage device.

In some embodiments, the controller is further configured to send the encrypted user content data for back-up storage by sending the encrypted user content data to the host computer system via the data path.

In some embodiments, the cryptographic key data is stored on cloud storage.

In some embodiments, the controller is further configured to: receive the encrypted user content data from the host computer system via the data path; receive the cryptographic key data from the user device over the communication channel that is different from the data path; and provide the cryptographic key data to the cryptography engine for decryption of the encrypted user content data in response to a request from the host computer system.

In some embodiments, the encrypted user content data and the cryptographic key data are stored external to the data storage device to be accessible by a user to download and decrypt external to the data storage device.

In some embodiments, the encrypted user content data is stored external to the data storage device to be accessible by a user to download onto a further data storage device via the data path of the further data storage device; and the cryptographic key data is stored external to the data storage device to be accessible by the user to download onto a further user device and to provide the cryptographic key data to the further data storage device over the communication channel that is different from the data path of the further data storage device.

In some embodiments, the encrypted user content data and the cryptographic key data are stored external to the data storage device on one or more cloud storage systems; an account on the one or more cloud storage systems is associated with the user; and upon the user authenticating with the account, the one or more cloud storage systems provide access to the encrypted user content data and the cryptographic key data.

In some embodiments, the non-volatile storage medium is configured with one or more partitions to store the encrypted user content data, and the controller is configured to send the one or more partitions to the host computer system for back-up storage.

In some embodiments, the back-up storage is configured to: receive a request for encrypted user content from a user; determine a block range in the one or more partitions based on the request; and send the encrypted user content in the block range to the user, where the encrypted user content in the block range is decryptable using the cryptographic key data.

In some embodiments, determining the block range is based on one or more requested file system data objects.

In some embodiments, the encrypted user content in the block range is less than one of the one or more partitions.

In some embodiments, the controller is configured to: generate the cryptographic key data internal to the data storage device; provide the cryptographic key data to the cryptography engine for decryption of the encrypted user content data in response to a request from the host computer system; and upon request by the user device, send the generated cryptographic key data to the user device for storage and use external to the data storage device.

Another general aspect includes a method for storing data that includes: storing encrypted user content data on a data storage device; registering the data storage device with a host computer system as a block data storage device to transmit data between a host computer system and the data storage device, using cryptographic key data internal to the data storage device to encrypt user content data received from the host computer system and to decrypt the encrypted user content data stored on a storage medium in response to a request from the host computer system; sending the encrypted user content data from the data storage device to the host computer system via a data path for back-up storage external to the data storage device as encrypted by the cryptographic key data; and communicating between the data storage device and a user device over a communication channel that is different from the data path, to send the cryptographic key data from the data storage device to the user device for decryption of the encrypted user content external to the data storage device.

In some embodiments, the method further includes storing the encrypted user content data and the cryptographic key data external to the data storage device to be accessible by a user to download and decrypt external to the data storage device.

In some embodiments, the method further includes: storing the encrypted user content data external to the data storage device to be accessible by a user; downloading the encrypted user content data onto a further data storage device via the data path of the further data storage device; storing the cryptographic key data external to the data storage device to be accessible by the user; downloading the cryptographic key data onto a further mobile user device; and sending the cryptographic key data from the mobile user device to the further data storage device over the communication channel that is different from the data path of the further data storage device.

In some embodiments, the user device is a mobile phone associated with the user.

In some embodiments, sending the encrypted user content data includes sending a partition of the data storage device.

In some embodiments, the method further includes: receiving a request for encrypted user content from a user; determining a block range in the one or more partitions based on the request; and sending the encrypted user content in the block range to the user, where the encrypted user content in the block range is decryptable using the cryptographic key data.

Still another aspect includes a non-transitory computer-readable storage medium integrated with a data storage device and that has firmware stored thereon that, when executed by a controller of the data storage device, causes the controller to perform the steps of: storing encrypted user content data on a data storage device; registering the data storage device with a host computer system as a block data storage device transmit data between a host computer system and the data storage device, using cryptographic key data internal to the data storage device to encrypt user content data received from the host computer system and to decrypt the encrypted user content data stored on a storage medium in response to a request from the host computer system; sending the encrypted user content data from the data storage device to the host computer system via a data path for back-up storage external to the data storage device as encrypted by the cryptographic key data; and communicating between the data storage device and a user device over a communication channel that is different from the data path, to send the cryptographic key data from the data storage device to the user device for decryption of the encrypted user content external to the data storage device.

Still another aspect includes a data storage device including: means to store encrypted user content data on a data storage device; means to register the data storage device with a host computer system as a block data storage device transmit data between a host computer system and the data storage device; means to use cryptographic key data internal to the data storage device to encrypt user content data received from the host computer system and to decrypt the encrypted user content data stored on a storage medium in response to a request from the host computer system; means to send the encrypted user content data from the data storage device to the host computer system via a data path for back-up storage external to the data storage device as encrypted by the cryptographic key data; and means to communicate between the data storage device and a user device over a communication channel that is different from the data path, to send the cryptographic key data from the data storage device to the user device for decryption of the encrypted user content external to the data storage device.

DETAILED DESCRIPTION

Figure 1:
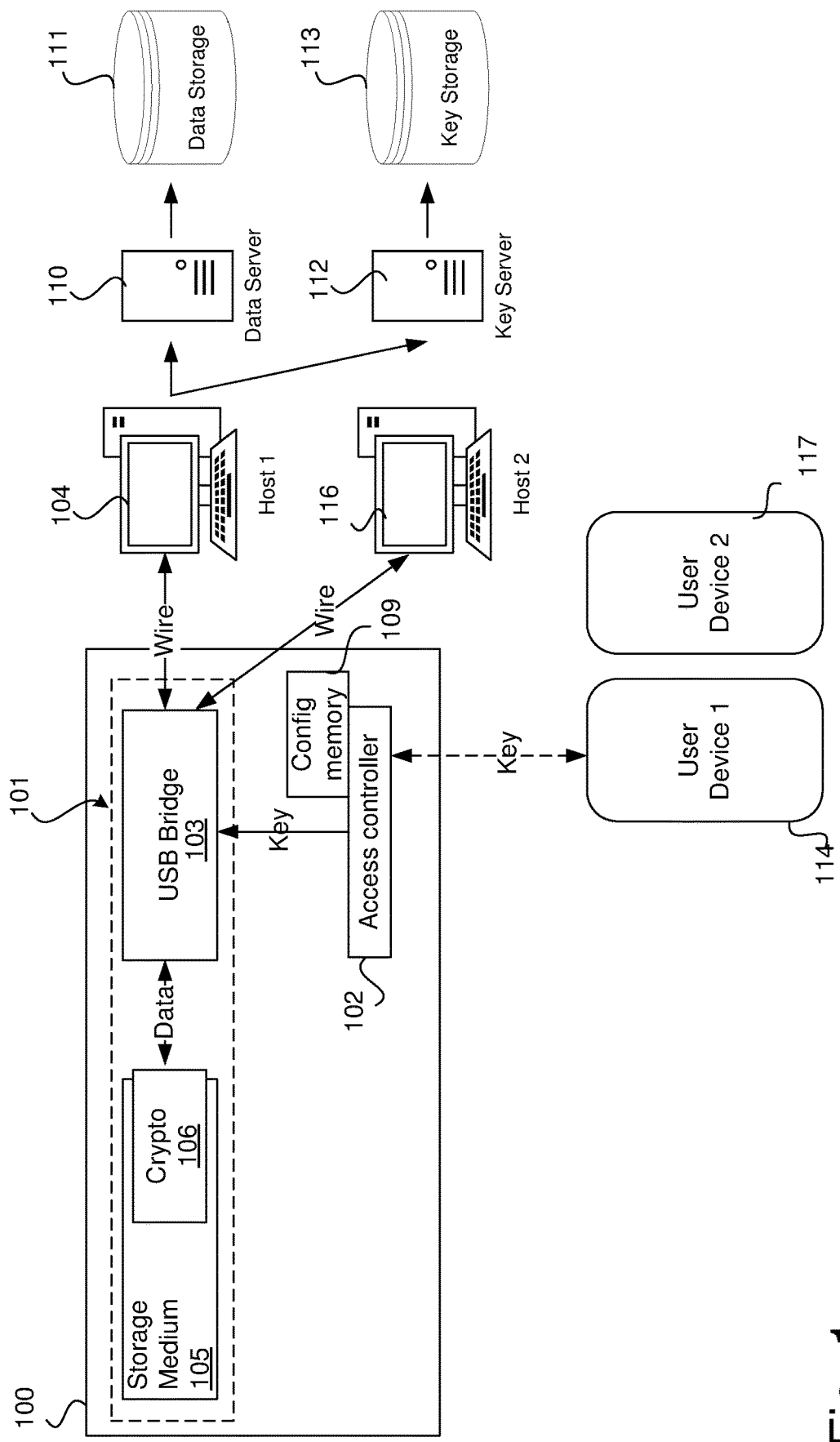
FIG. 1 illustrates a data storage device, according to some embodiments.

FIG. 1 illustrates a data storage device (DSD) 100 comprising a data path 101 and an access controller 102, according to an embodiment. The data path 101 comprises a wire-based data port 103, which is provided in FIG. 1 by a USB bridge, for transmission of data between a host computer system 104 and the DSD 100. In other embodiments, the data path 101 comprises a wireless data port (not shown) for wireless transmission of data between the host computer system 104 and the DSD 100. The DSD 100 registers with the host computer system 104 as a mass data storage device providing the functionality to the operating system of the host computer system 104 of a block data storage device. DSD 100 further comprises a non-transitory storage medium 105 to store encrypted user content data, noting that the user content data is the data that a user would typically want to store on a DSD, such as files including image files, documents, video files, etc. The storage medium may be a solid state drive (SSD), hard disk drive (HDD) with a rotating magnetic disk or other non-volatile storage media. Further, the storage medium may be a block data storage device, which means that the user content data is written in blocks to the storage medium 105 and read in blocks from the storage medium 105.

Command Set

In one example, storage medium 105 comprises a cryptography engine 106 in the form of a dedicated and/or programmable integrated circuit that encrypts data to be stored on storage medium 105 and decrypts data to be read from storage medium 105. In such examples, the storage medium may provide a Small Computer System Interface (SCSI) or Advanced Technology Attachment (ATA) command set according to the Opal specification by the Trusted Computing Group (TCG).

Program code stored on the cryptography engine 106 enables the cryptography engine 106 to receive, interpret and execute commands received from host computer system 104. For example, cryptography engine 106 may be configured to implement the standard ATA or serial ATA (SATA) and/or ATA Packet Interface (ATAPI) command set, which is available from Technical Committee T13 noting that identical functionalities can be implemented within TCG Opal, SCSI and other proprietary architectures. The command set comprises a READ SECTORS command with a command input of the count of sectors and the starting sector (noting that "sector" is used synonymously with "block" herein). Accordingly, there is a corresponding write command. It is noted that there is a data storage device driver installed on host computer system 104. The data storage device driver (not shown) uses the command set to provide high-level services to the operating system, such as file read functionalities. In some examples, the data storage device driver is a generic driver supplied as part of the operating system without support for device-specific encryption commands since the encryption functionality is hidden from the host computer system 104 and handled internally within DSD 100 as described below.

The command set provided by the cryptography engine 106 to the data port 103 (but not forwarded to host computer system 104) may include a command set from the ATA SECURITY feature set. In particular, the command set may include the command SECURITY SET PASSWORD or a corresponding command from TCG Opal to set a password for reading and writing user content data to the storage medium 105.

In this sense, cryptography engine 106 is connected between the data port 103 and the storage medium 105 and is configured to use a cryptographic key to encrypt user content data to be stored on the storage medium 105 and to decrypt the encrypted user content data stored on the storage medium 105 in response to a request from the host computer system 104. In some examples, the ATA SECURITY feature set is used only by data port 103 and not by host 104. That is, the access controller 102 provides the necessary input for the data port 103 to issue the ATA SECURITY commands to the cryptography engine 106. For example, the access controller 102 may provide a key to the data port 103, which the data port 103 then forwards to the cryptography engine 106 via the SECURITY SET PASSWORD command. There may be a further command to disable decryption to obtain the encrypted user data for backup. In that case, there may be a SECURITY DECRYPTION DISABLE command that causes the cryptographic engine 106 to simply provide the encrypted user content data. Access controller 102 may issue this command responsive to back-up being desired, such as in the process described with reference to FIG. 3, for example.

The interface between the access controller 102 and the data port 103 may be an Inter-Integrated Circuit (I2C) bus, which is particularly useful in cases where this bus is already implemented in existing chips. However, it is possible to use many other communication architectures including bus, point-to-point, serial, parallel, memory based and other architectures.

Note that the separation of functionalities in dedicated chips as shown in FIG. 1 is only one possible example implementation. Therefore, it is possible to combine functionalities or split the functionalities further. For example, data port 103 may be integrated with access controller 102 into a single chip with a single core. In other cases, the data port 103 and the access controller 102 can be integrated with cryptography engine 106 into a single dedicated chip with a single core. Of course, all chips may have multiple cores.

In one example, the following components are used:
Data port 103: USB 3.1 Gen 2 10 gigabits per second (Gb/s) interface Access controller 102: nRF52840 system-on-chip (SoC) from Nordic Semiconductor It is noted that for the functionality disclosed herein, the access controller 102 plays the leading role and will be described in more detail below, noting again that the tasks may be separated into separate chips in other examples. Where reference is made to a 'configuration' of the access controller 102 or the access controller 102 being 'configured' to perform a certain step, this is to be understood to relate to program code that is stored on non-volatile memory in the DSD 100 on program memory (not shown for clarity) and executed by the access controller 102.

In other examples, some or all steps disclosed herein may be performed by hardware circuitry without program code. In particular, encryption primitives may be implemented by dedicated hardware circuitry for performance and security reasons. For example, commands that are particularly computationally demanding, such as elliptic curve multiplication or exponentiation, may be implemented by an Arithmetic Logic Unit (ALU) specifically designed for this calculation, such that the calculation can be performed in a single or a smaller number of processor cycles compared to using a sequential program in a general purpose microcontroller. It is further noted that the chips included in DSD 100 are microcontrollers, which means in this context that they do not run under an operating system that provides a hardware abstraction layer but the program code acts directly on the hardware circuit. While elliptic curve cryptography is used herein as examples for reasons of computational efficiency and security, it is noted that other public-key cryptosystems, such as the Rivest-Shamir-Adelman (RSA) cryptosystem, could equally be used.

External Devices

Returning to FIG. 1, there are a number of devices in addition to host computer system 104 that are external to the DSD 100 and that act in relation to backing up data from the DSD 100. In particular, there is a data server 110 that hosts data storage 111. Data server 110 receives encrypted user data stored on DSD 100 from host 104 and stores the encrypted user data on data storage 111. The encrypted user data is encrypted (by cryptography engine 106 of DSD 100) using a cryptographic key, such as a public key that is associated with a private key that can be used to decrypt the encrypted user data. The host computer system 104 may send the private key to a key server 112, which stores the private key on a key storage 113. It is noted that there is a first storage instance for data storage 111 and a second storage instance for key storage 113. Both provide access control so that only authorized users can access the encrypted user data and the private key. More particularly, in one example, only the application installed on the user device 114 can access key storage 113 based on granted access as described below. Now there is a back-up of the encrypted user data on data storage 111 and the necessary private key is backed-up on key storage 113. Upon DSD 100 becoming unavailable, such as due to loss, damage or theft, a user can, after authorization, download the encrypted user data from data storage 111, download the private key from key storage 113 and thereby restore the backed-up data on a new DSD.

This back-up and restore can be facilitated by a user device 114, such as a mobile phone. An application may be installed on user device 114 to provide a user interface to a user and to provide authorization. In that sense, the user has an account and under that account, e.g., once the user provides the correct username and password, the user can control aspects of the data storage 111, the key storage 113 and DSD 100. DSD 100 provides a communication channel that is different from the wired data transfer channel to the host computer system 104. This out-of-band communication channel may be Bluetooth, Near Field Communication (NFC), or any other wired or wireless, near or far-distance communication method.

During use of DSD 100, the user can retrieve the private key from DSD 100 via the out-of-band communication channel. This is especially useful where DSD 100, and in particular access controller 102 or cryptography engine 106, has generated the private key. The user can obtain the key through the application installed on user device 114. User device 114 may then connect to the internet to transmit the private key to the key server 112. User device 114 may also transmit the private key to a new DSD to enable decryption on that new DSD.

While it is possible to also transfer the encrypted user data from DSD 100 to user device 114, the practicalities of transmitting large amounts of data over Bluetooth mean that it may be preferable to transfer the encrypted user data to host computer system 104 over the wired data communication channel and the host computer system 104 can then transmit the encrypted user data for storage to the data server 110. In yet another example, DSD 100 further comprises a Wi-Fi module and DSD 100 sends data for back-up over Wi-Fi.

Method Performed by Access Controller

As mentioned above, access controller 102 is configured, by way of program code or hardware implementation, to perform steps of backing-up the encrypted user data to essentially facilitate the application flow described above. In that sense, access controller 102 sends the encrypted user content data to the host computer system 104 via the data path 101 for back-up storage on data storage 111 hosted by data server 110 external to DSD 100. In other words, the host computer system 104 receives the encrypted data from DSD 100 and then, in turn, sends it to the external data storage 111. The back-up storage is encrypted by the cryptographic key data that was used by DSD 100, and in particular by cryptographic engine 106, to encrypt the user data. This means that without any further steps of communicating the cryptographic key data, the user data is not accessible, e.g., decryptable, by any other device or user.

Therefore, access controller 102 also communicates with user device 114 over the communication channel that is different from the data path 101, to send the cryptographic key data to the user device 114. The cryptographic key data enables decryption of the encrypted user content external to DSD. In other words, once the cryptographic key data is available external to DSD 100, the encrypted user data can be used, e.g., decrypted, outside DSD 100. More specifically, the encrypted user data can be restored on a different DSD if required.

Once the encrypted user data is stored on data store 111, there may be a further host computer system 116 that retrieves the encrypted user data from data store 111 and transmits the encrypted user data onto DSD 100 or another DSD via data path 101. Then, a user obtains the cryptographic key data from key storage 113 using user device 114 to authorize and request the cryptographic key data from key server 112. The key server 112 sends the cryptographic key data to the user device 114, which as before may be a private key or private/public key pair, symmetric key, ECDH challenge or other data.

The user device 114 presents a user interface to the user of the user device 114. This user interface provides an option, such as a button, for the user to send the cryptographic key data to the DSD 100. By selecting that option, the user causes the user device 114 to send the cryptographic key data to DSD (e.g., access controller 102). The access controller 102 provides the cryptographic key data to cryptography engine 106 for use in decryption. As a result, DSD 100 can perform hardware-accelerated encryption and decryption of the restored encrypted user content data.

Key Management

The cryptographic key data that access controller 102 transmits to user device 114 may be a private key of a private/public key pair. In that example, the user device 114 can derive the public key from the private key or the cryptographic key data may also include the public key in addition to the private key. In other examples, the cryptographic key data is a symmetric key that enables decryption of the encrypted user content data. In yet another example, the cryptographic key data is other data than enables the user device 114 or another device to derive the key required to decrypt the encrypted user content data. For example, the cryptographic key data may be a challenge of a Diffie-Hellman process, such as an Elliptic Curve Diffie Hellman (ECDH) processes to generate a shared secret and then use the shared secret as the key or derive the key from the shared secret or perform further communication between DSD 100 and user device 114 that is encrypted using the shared secret to transmit the cryptographic key data securely.

It is noted that this process of sending cryptographic key data may be needed in cases where DSD 100 generates the encryption key internally, such as by cryptography engine 106. In other cases, the encryption key is generated externally, such as by user device 114 or key server 112. In that case, DSD 100 can accept any key and use it for decryption. If the key is incorrect, the data transmitted to host computer system 104 will be unusable.

As set out above, there may be a separate key or key pair for each of the partitions of DSD 100. Those keys may be associated with a specific user. For example, the keys may be accessible from key storage 113 only upon successful authorization of the user. Further, the same user may be associated with all keys for all partitions, or different users may be associated with different partitions. In the latter example, each user can decrypt only the partitions to which the user holds the keys and not the other partitions. Key server 112 stores and manages the association between user accounts and keys.

Regardless of whether the DSD 100 generates the keys or the keys are generated elsewhere, as a result of the method, the keys are available on key storage 113 and user device 114. In that respect, the process may also be referred to as a synchronization, or more specifically key synchronization.

There may be a further user device 117 that serves as a replacement upon user device 114 being lost/damaged/stolen. In that case, the user can again download and install the application onto further user device 117, authorize into the user's account, and obtain cryptographic key data from DSD 100 and key server 112.

In a further example, the user registers DSD with the user's account. Access controller 102 only provides the cryptographic key data to the user device 114 upon successful authorization of the user with the application on the user device. For example, access controller 102 may generate a challenge, send the challenge to user device 114. User device 114 then sends the challenge to an authorization server, such as a server maintained by the manufacturer. Only that server can provide a response that is valid since DSD has been programmed before being shipped to generate such challenges. The authorization server sends the response back to user device 114 (only if the user is authenticated) and user device 114 sends the response to access controller 102. Access controller 102 validates the response, and upon successful validation, sends the cryptographic key data. It may also be said that the user unlocks DSD 100 by use of the user device 114. This may enable both the access to the decrypted user data via the data path 100 as well as access to the private key. Unlocking DSD 100 can happen in a variety of different ways, such as DSD 100 sending an ECDH challenge to user device 114 that can only be answered with a private key that is stored in a secure enclave of the user device 114 as described in PCT/US2020/039714, which is incorporated herein in full by reference. In some examples, the key is not stored on DSD 100 on non-volatile memory but only on volatile memory, such that the key becomes unavailable once DSD 100 is powered down. In this way, the DSD 100 locks itself on power down. It may then be required to provide the key again to DSD 100 through user device 114 on power-up to access decrypted user content data.

Cloud Services

It is noted that data server 110, data storage 111, key server 112 and key storage 113 can be implemented as cloud instances with a flexible number of server, storage and load balancing instances. Further, data server 110 and data storage 111 may be implemented on a separate platform from the key server 112 and key storage 113 so that the encrypted data and the associated keys are not stored on the same platform. The user device 114 can then contact the appropriate platforms, such as through the use of APIs directed at different web addresses, to obtain the relevant data. In other examples, the encrypted user data 111 can only be accessed by host computer system 104 that actually has a DSD connected to it, while the cryptographic key data on key storage 113 can only be accessed by a user device that is in communication with a DSD over Bluetooth (or other channels).

In the above examples, DSD 100 may be configured to provide a certificate to the host computer system 104. The host computer system 104 can obtain a root certificate from the manufacturer over the internet to verify the DSD certificate. The host computer system 104 can then send the certificate to the data server 110 and the data server also validates the certificate and provides data access only upon successful validation. This way, different DSDs can be registered by different users and reported as lost/damaged/stolen data server 110 can refuse access for those devices.

Similarly, access controller 102 may send a certificate to user device 114 which sends the certificate with the request for cryptographic key data to key server 112. Key server 112 also validates the certificate and provides the cryptographic key data only on successful validation.

It is also possible that the data server 110 and the key server 112 communicate and provide access to encrypted user data and cryptographic key data only if the same certificate, or two certificates from the same DSD are received by the data server 110 and the key server 112. The certificates may have an expiry date to give the user the option to retrieve the key data within a pre-set period of time after requesting the encrypted user data or vice versa. That period of time may be 1 minute, 1 hour or 1 day or any other value.

In yet another example, the application on the user device 114 may also be installed on the host computer system 104, so that host computer system 104 transfers the encrypted user data as well as the cryptographic key data. Host computer system 104 may still transfer the user data via data path 101 and transfer the cryptographic key data (to and from DSD 100) via a separate channel, such as Bluetooth. It is also possible that the separate channel is logically separate rather than physically separate. For example, user data may be transferred using a USB device type indicating a block storage device, while the cryptographic key data may be transferred using a USD device type indicating a human interface device.

Example Method

Figure 2:
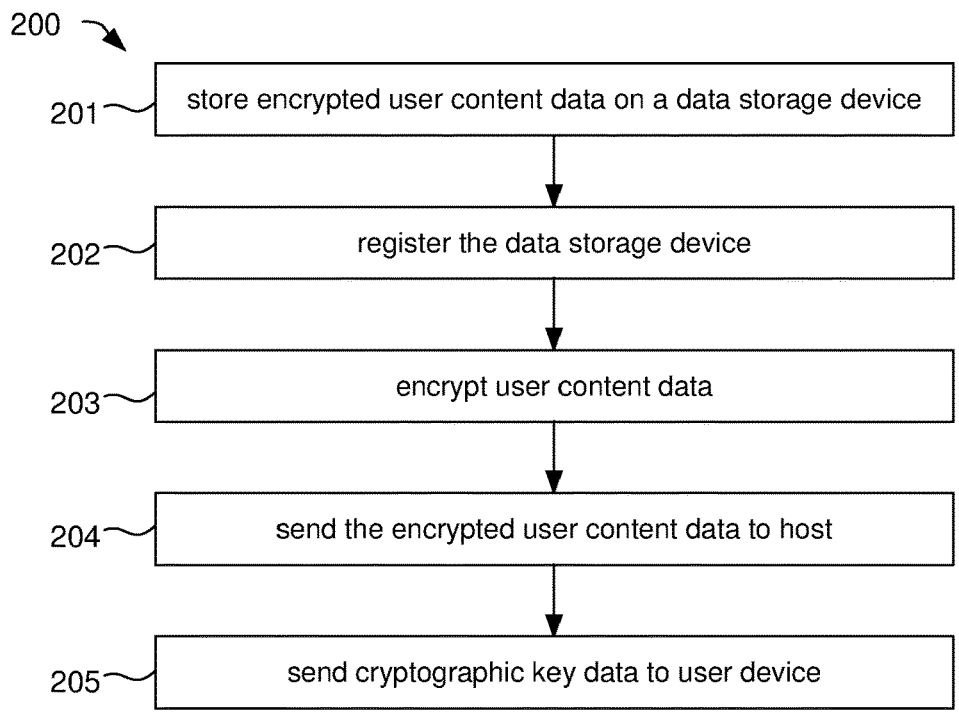
FIG. 2 illustrates a method for storing data, according to some embodiments.

FIG. 2 illustrates a method 200 for storing data on DSD 100 as performed by DSD 100, which means some steps may be performed by data path 101, access controller 102, USB bridge 103, storage medium 105, cryptography engine 106. This means access controller 102 is configured to perform the steps shown in FIG. 2 by way of program code, hardware circuitry or otherwise. The program code may be stored on a configuration memory 109, which may also store cryptographic key data or other configuration data.

DSD 100 stores 201 encrypted user content data on storage medium 105 as described above and according to block storage principles, including SATA protocols. In this way, DSD 100 registers 202 with host computer system 104 as a block data storage device to transmit data between a host computer system and the data storage device, DSD 100, e.g. cryptography engine 106, uses cryptographic key data internal to the data storage device to encrypt 203 user content data received from the host computer system and to decrypt the encrypted user content data stored on a storage medium in response to a request from the host computer system. Again, the cryptographic key data may be generated internally to DSD 100 or externally and provided to the DSD 100 out-of-band.

DSD 100 then sends 204 the encrypted user content data from the DSD 100 to the host computer system 104 via data path 101 for back-up storage external to the data storage device, such as on data storage 111. In another example, DSD 100 sends the encrypted user content data to data storage 111 without involving the host computer system 104. In that case, DSD 100 may have direct access to the internet, such as through a Wi-Fi network adaptor integrated with DSD 100. The encrypted user data is sent and stored as encrypted by the cryptographic key data on DSD 100. This means the encrypted user content data is not decrypted and re-encrypted in transfer (e.g., by the cryptography engine, the host computer system 104 or data server 110).

DSD 100 communicates with user device 114 over a communication channel that is different from the data path 101, to send the cryptographic key data from the DSD 100 to the user device 114. As described above, this enables decryption of the encrypted user content external to the data storage device. For example, the encrypted data can be restored onto a new DSD and decrypted using the cryptographic key data stored on key storage 113.

Further to the steps in method 200 and as alluded to above, DSD 100 or another (e.g., new or replacement) DSD receives the encrypted user content data from the host computer system 104 (or another host computer system) via its data path. That DSD further receives the cryptographic key data from user device 114 or another user device over the communication channel that is different from the data path. DSD 100 provides the cryptographic key data to the cryptography engine 106 for decryption of the encrypted user content data (received from data server 104) in response to a request from the host computer system 104 for decrypted user content data, such as in response to a SATA read command.

Partitions

The non-volatile storage medium 105 may be configured with one or more partitions to store the encrypted user content data. Each of those partitions may be defined by block ranges and host respective mapping from file names to physical blocks of storage, such as file allocation tables (FATs), inodes, etc. Those tables or other file format dependent mechanisms, map a file name to a range of blocks on the storage medium 105. In one example, storage medium has 1 TB storage capacity and there can be 8*128 GB partitions. In a further example, each partition has its unique key pair. This means DSD 100 uses a different private key to encrypt each of the partitions.

In some examples, DSD 100 makes full-partition back-ups. This may be done periodically and essentially stores a snapshot of the entire partition as one item on data storage 111. That is, access controller 102 is configured to send the one or more partitions to the host computer system 104 for back-up storage.

As the entire partition is stored on data storage 111, a user may request the entire partition for download. However, in some scenarios, the user only wants a single or multiple files. In that case, downloading the entire partition would take much longer than what would be necessary to download the files. Therefore, the back-up storage, e.g., data server 110 determines which part of the partition is requested and sends only that part—keeping in mind that the partition is encrypted, so data server 110 cannot read the partition in plain text.

Therefore, data server 110 receives a request for encrypted user content from a user. This request may include a block range of the requested data. For example, the request is for a particular file system object, such as a file or a folder. In that example, the mapping of the file system to physical blocks has been sent previously to the user device 114 and the user device 114 has decrypted the mapping. This way, the user device 114 can look-up the block range for that file or folder and request that range from the data server 110. In other examples, not the entire mapping is accessible but only the top levels, such as the first layer of folders or down to a predefined depth of folders, such as a depth of 3. In that case, the user device 114 determines a range that contains the requested file but may contain other data that is not the requested file. But the range is less than the entire partition, which reduces the download time dramatically.

In any event, data server 110 sends the encrypted user content in the block range to the user. That is, data server 110 does not decrypt the user content because the required key is not available to the data server 110. However, the encrypted user content in the block range is decryptable using the cryptographic key data from key storage 113. That is, DSD 100, host computer system 104, user device 114 or any other device, provided with the required cryptographic key data from key storage 113 can decrypt the user data in the block range and potentially discard any unwanted data to retrieve the requested file system data object, such as file or folder.

Figure 3:
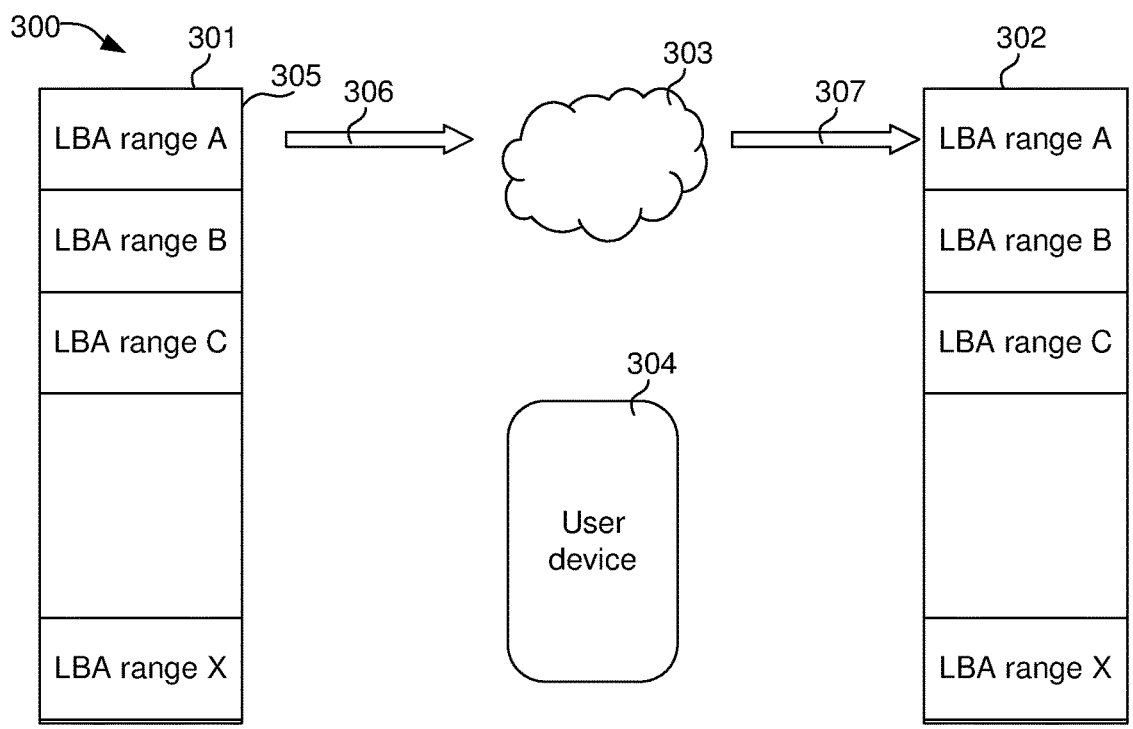
FIG. 3 illustrates a back-up system, according to some embodiments.

FIG. 3 illustrates an example back-up system 300 comprising a first DSD 301, a second DSD 302, cloud storage 303, and a user device 304, according to an embodiment. In this example both DSDs 301/302 are TCG/OPAL devices with encryption enabled using a key. First DSD 301 has a number of partitions, such as partition 305, and each partition is defined by a local block address (LBA) range. DSD 100 backs-up 306 each LBA range, i.e., each partition, separately to cloud storage 303. Cloud storage 303 stores the encrypted data, which is still encrypted by the key used by first DSD 301 to encrypt the data. The key is communicated to user device 304 as described herein. It is now possible to restore 307 the encrypted user content data to the second DSD 302. As a result, the second DSD 302 has exactly the same partition structure as the first DSD 301. That is, each partition on second DSD 302 has the same capacity as the corresponding partition on first DSD 301.

During restore operations, a device may request only part of the file, which may be useful for larger files, such as video files. Data server 110 then retrieves that part and the requesting device can decrypt part. This way, the large file can be restored in parts so that parts become available more quickly compared to downloading the entire file.

In yet another example, the restore device requests the first part of the partition that contains the encrypted mapping of the file system to the physical LBA ranges. The device also has the key available and can therefore decode the mapping on the device. This means the data server 110 does not have access to the mapping. However, the restore device can now determine which parts of the partition (e.g., which chunks or LBA ranges) need to be requested to obtain a desired file, part of a file or folder.

In yet another example, the encrypted user data is stored in a Network File System (NFS), which is a distributed file system protocol. The used NFS may be of any version, including version 2, 3, 4, and WebNFS chunk file system. The NFS provides the option of requesting chunks of data, which are then provided in encrypted form as stored on data storage 111. Further, the requesting device may simply mount the data storage 111 and decrypt the data as required for access, including the mapping to LBA ranges.

Back-up Mechanisms

In one example, DSD 100 or host computer system 104 or user device 114 initiates a periodic backup automatically at a predetermined time period, such as once an hour/day/week.

In other examples, responsive to controller 102 observing any LBA within the secure back-up range has been modified after the previous back-up, it will be marked for back-up again. Controller 102 may use a timestamp mechanism since last back-up to track the LBAs for back-up.

Controller 102 may maintain a "secure back-up log", which may be owned by a flash transaction layer (FTL). In the "secure back-up log", controller 102 maintains the LBA-back_up_marker-timestamp information, and this is flushed to configuration memory 109 periodically and on power-down situations. The secure back-up log is loaded upon power-on to system memory.

In another example, DSD 100 performs a continuous backup. In this approach, once data is written to storage medium 105, a message is sent to a security sub-system to securely back-up this data. The encrypted host data will be present in storage sub-system's memory. Controller 102 copies the data to Security sub-system's memory. The controller 102 may then free the storage sub-system's memory once back-up is complete or keep the data so it is written to the storage medium.

In yet another example, DSD 100 performs user-initiated back-up. In this approach, the host computer system 104 is stalled and DSD 100 will not accept commands from host computer system 104 until back-up completes, to avoid data race conditions.

Figure 4:
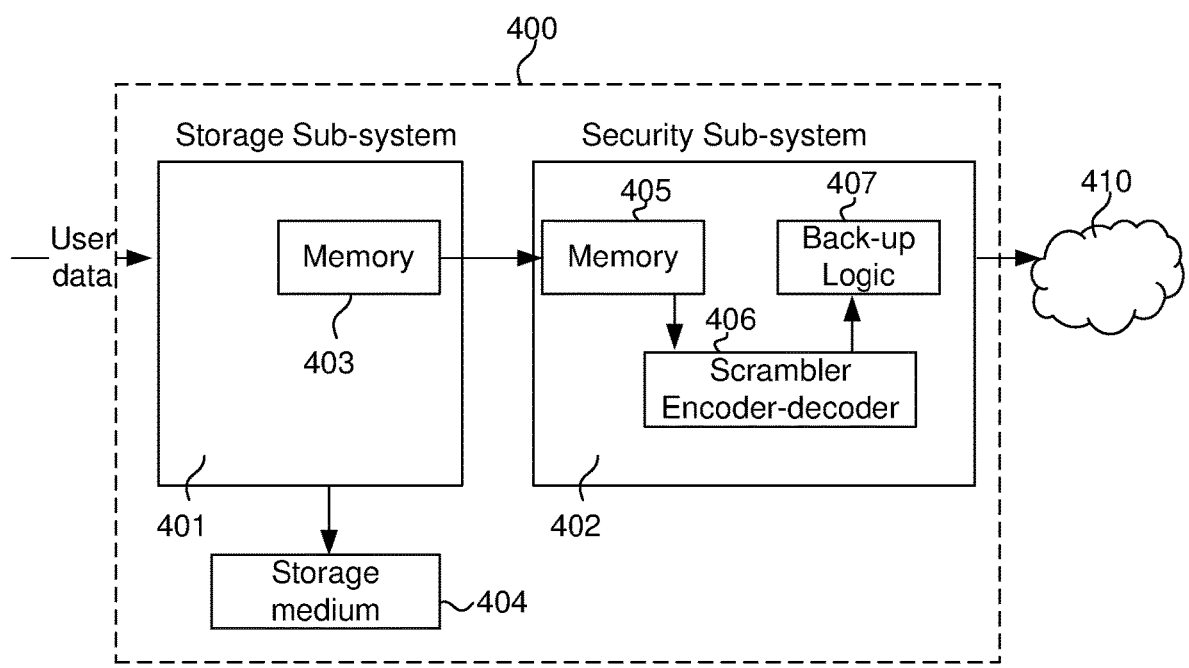
FIG. 4 illustrates the data storage device of FIG. 1 in more detail, according to some embodiments.

FIG. 4 illustrates DSD 400 in more detail according to an embodiment. In this example, DSD 100 comprises storage sub-system 401 and security sub-system 402, which are both considered to be part of the data path 101 shown in FIG. 1. Storage sub-system 401 performs hardware encryption of user data. Storage sub-system 401 comprises volatile memory 403 and communicates with a non-volatile (e.g., NAND) storage medium 404. Security sub-system 402 also comprises volatile memory 405, a scrambler and encoder-decoder 406 and back-up logic 407.

A secure back-up log stores the appropriate information for back-up of an LBA range. Firmware initiates reads for these LBA to memory 403 of storage sub-system 401 memory. Data is then copied to memory 405 of security sub-system 402. Once copied, memory 403 of storage sub-system 401 is made free.

Scrambler/encoder-decoder 406 is similar to a storage encoder-decoder which encodes the data coming from storage sub-system 401. Security sub-system 402 waits for a chunk of data to be available for back-up. Security sub-system handles overwriting of LBA data and back-up the most recent version to cloud storage 410. More specifically, each LBA will be backed-up as an individual file (binary or output of scrambler in security sub-system), so that the LBA->Data mapping process is efficient.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device, comprising:
a data path comprising:
    a data port configured to transmit data between a host computer system and the data storage device, wherein the data storage device is configured to register with the host computer system as a block data storage device;
    a non-volatile storage device configured to store encrypted user content data; and
    a cryptography engine connected between the data port and the non-volatile storage device and configured to use cryptographic key data to encrypt user content data received from the host computer system and to decrypt the encrypted user content data stored on the non-volatile storage device in response to a request from the host computer system, and
a controller configured to:
    send the encrypted user content data for back-up storage external to the data storage device as encrypted by the cryptographic key data; and
    communicate with a user device over a communication channel that is different from the data path, to send the cryptographic key data for decryption of the encrypted user content data external to the data storage device.

2. The data storage device of claim 1, wherein the controller is further configured to send the encrypted user content data for back-up storage by sending the encrypted user content data to the host computer system via the data path.

3. The data storage device of claim 1, wherein the cryptographic key data is stored on cloud storage.

4. The data storage device of claim 1, wherein the controller is further configured to:
receive the encrypted user content data from the host computer system via the data path;
receive the cryptographic key data from the user device over the communication channel that is different from the data path; and
provide the cryptographic key data to the cryptography engine for decryption of the encrypted user content data in response to a request from the host computer system.

5. The data storage device of claim 1, wherein the encrypted user content data and the cryptographic key data are stored external to the data storage device to be accessible by a user to download and decrypt external to the data storage device.

6. The data storage device of claim 5, wherein:
the encrypted user content data is stored external to the data storage device to be accessible by a user to download onto a further data storage device via a data path of the further data storage device; and
the cryptographic key data is stored external to the data storage device to be accessible by the user to download onto a further user device and to provide the cryptographic key data to the further data storage device over a communication channel that is different from the data path of the further data storage device.

7. The data storage device of claim 6, wherein:
the encrypted user content data and the cryptographic key data are stored external to the data storage device on one or more cloud storage systems;
an account on the one or more cloud storage systems is associated with the user; and
upon the user authenticating with the account, the one or more cloud storage systems provide access to the encrypted user content data and the cryptographic key data.

8. The data storage device of claim 1, wherein;
the non-volatile storage device is further configured with one or more partitions to store the encrypted user content data; and
the controller is further configured to send the one or more partitions to the host computer system for back-up storage.

9. The data storage device of claim 8, wherein:
the back-up storage is configured to:
    receive a request for encrypted user content from a user;
    determine a block range in the one or more partitions based on the request; and
    send the encrypted user content in the block range to the user; and
the encrypted user content in the block range is decryptable using the cryptographic key data.

10. The data storage device of claim 9, wherein determining the block range is based on one or more requested file system data objects.

11. The data storage device of claim 9, wherein the encrypted user content in the block range is less than one of the one or more partitions.

12. The data storage device of claim 1, wherein the controller is further configured to:
generate the cryptographic key data internal to the data storage device;
provide the cryptographic key data to the cryptography engine for decryption of the encrypted user content data in response to the request from the host computer system; and
upon request by the user device, send the generated cryptographic key data to the user device for storage and use external to the data storage device.

13. A method for storing data, the method comprising:
storing encrypted user content data on a data storage device;
registering the data storage device with a host computer system as a block data storage device to transmit data between the host computer system and the data storage device;
using cryptographic key data internal to the data storage device to encrypt user content data received from the host computer system and to decrypt the encrypted user content data stored on a non-volatile storage device in response to a request from the host computer system;
sending the encrypted user content data from the data storage device to the host computer system via a data path for back-up storage external to the data storage device as encrypted by the cryptographic key data; and
communicating between the data storage device and a user device over a communication channel that is different from the data path, to send the cryptographic key data from the data storage device to the user device for decryption of the encrypted user content data external to the data storage device.

14. The method of claim 13, further comprising storing the encrypted user content data and the cryptographic key data external to the data storage device to be accessible by a user to download and decrypt external to the data storage device.

15. The method of claim 13, further comprising:
storing the encrypted user content data external to the data storage device to be accessible by a user;
downloading the encrypted user content data onto a further data storage device via a data path of the further data storage device;
storing the cryptographic key data external to the data storage device to be accessible by the user;
downloading the cryptographic key data onto a further mobile user device; and
sending the cryptographic key data from the further mobile user device to the further data storage device over a communication channel that is different from the data path of the further data storage device.

16. The method of claim 13, wherein the user device is a mobile phone associated with a user.

17. The method of claim 13, wherein sending the encrypted user content data comprises sending a partition of the data storage device.

18. The method of claim 13, further comprising:
receiving a request for encrypted user content from a user;
determining a block range in one or more partitions of the non-volatile storage device based on the request; and
sending the encrypted user content in the block range to the user, wherein the encrypted user content in the block range is decryptable using the cryptographic key data.

19. The method of claim 13, further comprising:
generating the cryptographic key data internal to the data storage device;
providing the cryptographic key data to a cryptography engine in the data path for decryption of the encrypted user content data in response to the request from the host computer system; and
sending, upon request by the user device, the generated cryptographic key data to the user device for storage and use external to the data storage device.

20. A data storage device comprising:
a non-volatile storage device configured to store encrypted user content data;
means to register the data storage device with a host computer system as a block data storage device to transmit data between the host computer system and the data storage device;
means to use cryptographic key data internal to the data storage device to encrypt user content data received from the host computer system and to decrypt the encrypted user content data stored on a non-volatile storage device in response to a request from the host computer system;
means to send the encrypted user content data from the data storage device to the host computer system via a data path for back-up storage external to the data storage device as encrypted by the cryptographic key data; and
means to communicate between the data storage device and a user device over a communication channel that is different from the data path, to send the cryptographic key data from the data storage device to the user device for decryption of the encrypted user content data external to the data storage device.

* * * * *